United States Patent
Xie (10) Patent No.: US 6,464,352 B1
(45) Date of Patent: *Oct. 15, 2002

(54) DETACHABLE SHELTER FRAME FOR MOUNTING IN FRONT OF A PRIMARY SPECTACLE FRAME

(76) Inventor: Yiling Xie, 10699 Hickson St., #4, El Monte, CA (US) 91731

( * ) Notice: Subject to any disclaimer, the term of this patent is extended or adjusted under 35 U.S.C. 154(b) by 0 days.

This patent is subject to a terminal disclaimer.

(21) Appl. No.: 09/929,429

(22) Filed: Aug. 13, 2001

(51) Int. Cl.[7] .................................. G02C 9/00
(52) U.S. Cl. ............................. 351/47; 351/57
(58) Field of Search ..................... 351/47, 48, 41, 351/57, 58

(56) References Cited

U.S. PATENT DOCUMENTS 6,231,180 B1 * 5/2001 Xie ........................... 351/47

* cited by examiner

Primary Examiner—Hung Xuan Dang
(74) Attorney, Agent, or Firm—Raymond Y. Chan; David and Raymond Patent Group (57) ABSTRACT

A detachable shelter frame is constructed to mount on a primary spectacle frame by two resilient mounting devices which are extended from two inner sides of two auxiliary lenses respectively. Each of the resilient mounting devices includes a resilient arms extending rearwardly from the shelter frame and an engaging member which is connected to the resilient arm and extended to press against a rear side of the primary bridge of the primary spectacle frame, wherein the two resilient arms substantially pull the two engaging members towards the primary spectacle frame so as to apply an urging pressure against the primary spectacle frame for holding the frame body of the primary spectacle between the primary spectacle frame and the engaging members, so as to securely mounting the shelter frame in front of the primary spectacle frame.

33 Claims, 9 Drawing Sheets

DETACHABLE SHELTER FRAME FOR MOUNTING IN FRONT OF A PRIMARY SPECTACLE FRAME

BACKGROUND OF THE PRESENT INVENTION

1. Field of Invention

The present invention relates spectacle frame, and more particularly to a detachable shelter with auxiliary lenses such as sunglasses, which is adapted for mounting on a primary spectacle frame by means of a resilient arrangement.

2. Description of Related Arts

Shelter frames are widely used today. A conventional shelter frame such as clip-on sunglasses comprises a plurality of clipping claws for detachably mounting on shortsighted or farsighted sunglasses so that the wearer does not need to carry and pay for another pair of shortsighted or farsighted sunglasses. However, the metal made clipping claws may scratch the lenses of the primary eyeglasses during the mounting process. Also, the wearer requires both hands to align and engage the conventional clip-on sunglasses on the primary eyeglasses in correct position. It is troublesome and dangerous for a wearer to use his or her both hands to wear such clip-on sunglasses on the regular glasses while he or she is driving.

In order to solve the problems of the above mentioned clip-on sunglasses, magnetic attachment is recently introduced into the eyeglasses industry. A primary pair of magnet members is affixed on two upper side extensions of a primary spectacle frame respectively. A shelter frame such as a sunglasses includes a pair of arms for supporting on the upper side extensions for preventing the shelter frame from moving downward relative to the primary spectacle frame and an auxiliary pair of magnet members connected to the arms respectively for engaging with the primary magnet members of the primary spectacle frame so as to stably attach the shelter frame to the primary spectacle frame. However, the users have to align two pairs of magnet members. If the auxiliary magnet members of the sunglasses are misaligned with the primary magnet members of the primary spectacle frame, the sunglass will fall down from the primary spectacle frame easily.

Thus, the major drawback of the eyeglasses equipped with the magnet attachment is that the primary spectacle frame needs to be altered its original structural design in order to affix the magnet members thereon. So, the wearer may have to buy a pair of spectacle frames including a primary eyeglasses and an auxiliary sunglasses, which is much expensive than that the wearer needs to buy the clip-on sunglasses only. Moreover, a pair of primary magnet members is always located in front of the user's eyes.

U.S. Pat. No. 6,231,180, invented by the applicant of the present invention, entitled "Detachable Shelter Frame for Spectacles", solves the above drawbacks of both the clip-on shelter frame and the magnetic shelter frame by providing the shelter frame with a pair of resilient mounting devices for mounting the shelter frame on the primary spectacle frame. In which, each of the resilient mounting devices comprises a resilient arm extending rearwardly from the respective auxiliary lens of the shelter frame to ride on the primary spectacle frame, and an engaging member which is connected to the resilient arm and extended to press against a rear side of the primary spectacle frame, wherein the two resilient arms substantially pull the two engaging members towards the primary spectacle frame so as to apply an urging pressure against the primary spectacle frame for holding the frame body of the primary spectacle frame between the shelter frame and the engaging members, so as to securely mounting the shelter frame in front of the primary spectacle frame.

The '180 substantially achieves the following features:

(a) The detachable shelter frame can be precisely and easily attached on a primary spectacle frame by means of a resilient mounting device so as to securely mount on the primary spectacle frame without the use of any magnet and the risk of scratching the lenses of the primary spectacle frame like the conventional clip-on sunglasses.

(b) The two resilient arms of the shelter frame are arranged to engage with the two side extensions or the lens frame of the primary spectacle frame, so as to prevent up and down movement or sideward movement of the shelter frame with respect to the primary spectacle frame.

(c) The wearer may merely use one hand to attach or detach the shelter frame during exercising or driving.

(d) it is adapted to be mount installed to all kinds of the primary spectacle frame because no specific modification is required for the primary spectacle frame to adapted the shelter frame.

(e) jit does not require to change the original structural design of the primary spectacle frame, so as to minimize the purchasing cost for the users.

Since the independent claim 1 of the '180 patent has no limitation to where the pair of resilient arms are rearwardly extended from the auxiliary lenses of the shelter frame, it not only covers the structure of having the two resilient mounting devices provided at two outer sides of the two auxiliary lenses respectively or affixed to upper and lower portions of the two outer sides of the two auxiliary lenses respectively, but also covers the structure of having the two resilient mounting devices affixed to two inner sides of the two auxiliary lenses respectively, including the two ends of the bridge between the two auxiliary lenses of the shelter frame. In other words, each of the two embodiments of the resilient mounting devices (22, 23), (22", 23") as disclosed in the '180 patent is capable of affixing to the two ends of the bridge of the shelter frame.

In order to further illustrate the distinctive and remarkable features of the detachable shelter frame of the '180 patent, the applicant further discloses another preferred embodiment in the present invention.

SUMMARY OF THE PRESENT INVENTION

A main object of the present invention is to provide a detachable shelter frame for spectacles, wherein the detachable shelter frame can be precisely and easily attached on a primary spectacle frame by means of a resilient mounting device so as to securely mount on the primary spectacle frame without the use of any magnet and the risk of scratching the lenses of the primary spectacle frame like the conventional clip-on sunglasses.

Another object of the present invention is to provide a detachable shelter frame for spectacles, wherein at least two resilient arms of the shelter frame are arranged to engage with the lens frame of the primary spectacle frame, so as to prevent up and down or sideward movement of the shelter frame with respect to the primary spectacle frame.

Another object of the present invention is to provide a detachable shelter frame for spectacles, wherein the two resilient arms, which are extended from the bridge of the shelter frame, are specifically arranged to securely engage with the primary bridge of the primary spectacle frame, so as to prevent up and down or sideward movement of the shelter frame with respect to the primary spectacle frame.

Another object of the present invention is to provide a detachable shelter frame for spectacles, wherein the shelter frame is adapted to construct with a rimless frame without soldering.

Another object of the present invention is to provide a detachable shelter frame for spectacles, which provides a simple but secure attachment between the bridge and the lens so as to minimize the manufacturing cost of the shelter frame.

Another object of the present invention is to provide a detachable shelter frame for spectacles, wherein the shelter frame is adapted for all kinds of spectacles including rim and rimless spectacles. Thus, the shelter frame can be constructed as a rimless shelter frame for every conventional spectacles.

Another object of the present invention is to provide a detachable shelter frame for spectacles, wherein the wearer may merely use one hand to attach or detach the shelter frame during exercising or driving.

Another object of the present invention is to provide a detachable shelter frame for spectacles that is adapted to be mount installed to all kinds of the primary spectacle frame because no specific modification is required for the primary spectacle frame to adapt the shelter frame.

Another object of the present invention is to provide a detachable shelter frame for spectacles, which does not require to c hang e the original structural design of the primary spectacle frame, so as to minimize the purchasing cost for the users.

Accordingly, in order to accomplish the above objects, the present invention provides a detachable shelter frame adapted for mounting in front of a primary spectacle frame which comprises a frame body for mounting a pair of lenses in position. The frame body comprises a primary bridge connected between the two lenses and two side extensions provided at two outer sides of the lenses respectively each having a hinge portion extended rearwardly therefrom for pivotally coupling a temple.

The shelter frame for supporting two auxiliary lenses comprises a bridge extended between the two auxiliary lenses and a pair of resilient mounting devices provided on two inner sides of the auxiliary lenses for mounting the shelter frame on the primary spectacle frame.

Each of the resilient mounting device comprises a resilient arm extending rearwardly from an end portion of the bridge respectively to extend over the primary bridge of the primary spectacle frame, and an engaging member which is connected to the resilient arm and extended to press against a rear side of the primary spectacle frame, wherein the two resilient arms substantially pull the two engaging members towards the primary spectacle frame so as to apply an urging pressure against the primary spectacle frame for holding the frame body of the primary spectacle frame between the shelter frame and the engaging members, so as to securely mount the shelter frame in front of the primary spectacle frame.

DETAILED DESCRIPTION OF THE PREFERRED EMBODIMENT

Figure 1:
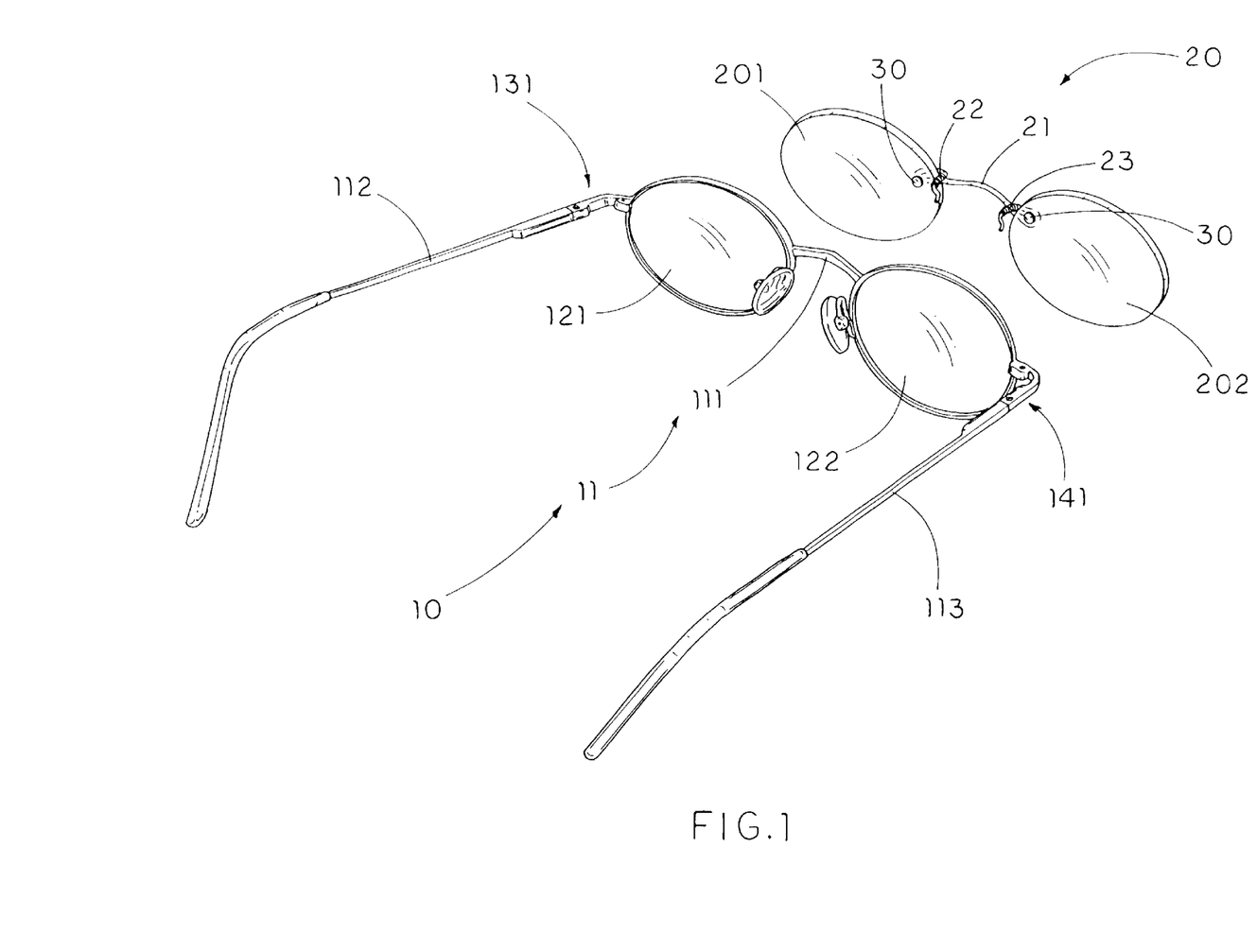
FIG. 1 is a perspective view of a detachable shelter frame for spectacle according to a first preferred embodiment of the present invention.
Figure 2:
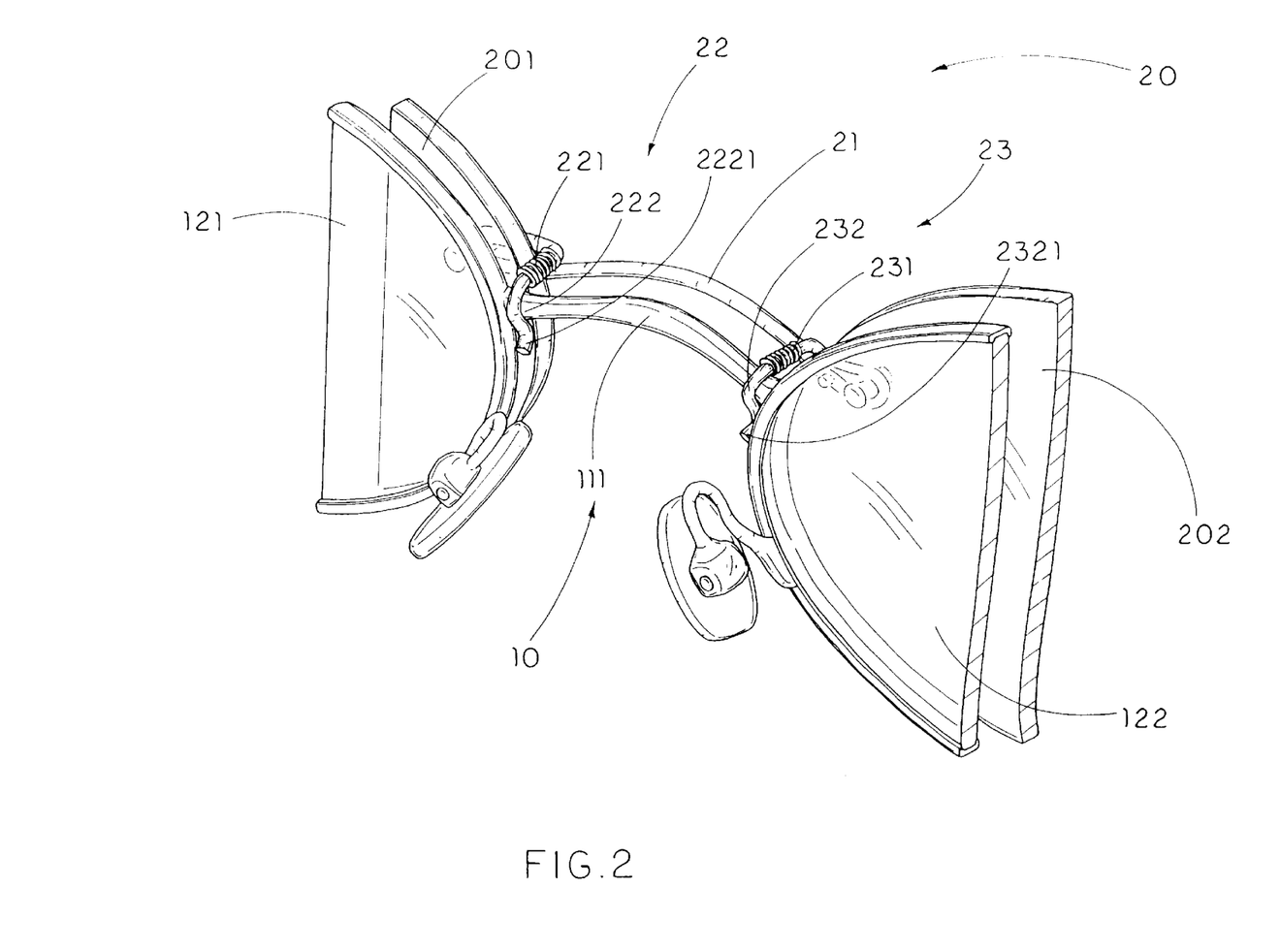
FIG. 2 is a perspective view of the detachable shelter frame mounted on a primary spectacle frame according to the above first preferred embodiment of the present invention.

Referring to FIGS. 1 and 2 of the drawings, a detachable shelter frame 20 adapted for mounting on a primary spectacle frame 10 according to a first preferred embodiment of the present invention is illustrated. The primary spectacle frame 10 comprises a frame body 11 for mounting a pair of lenses 121, 122 in position. The frame body 11 comprises a primary bridge 111 connected between the two lenses 121, 122 and two side extensions 13, 14 provided at two outer sides of the lenses 121, 122 respectively each having a hinge portion 131, 141 extended rearwardly therefrom for pivotally coupling a temple 112, 113.

Practically, the frame body 11 can be constructed as a conventional spectacle frame to have a pair of lens rims 11A, 11B as shown in FIG. 1 or a rimless frame that the primary bridge 111 and the two side extensions 13, 14 are directly fastened to the edges of the two lenses 121, 122. In other words, the primary spectacle frame 10 does not require to modify its original structure for mounting the detachable shelter frame 20 thereon. So, the detachable shelter frame 20 of the present invention fits for all kinds of conventional primary spectacle frame 10. In other words, the user does not need to buy a set of expensive primary spectacle frame and corresponding shelter frame. The user can merely additionally purchase a shelter frame 20 of the present invention to fit his or her current spectacle frame that he or she has originally.

As shown in FIGS. 1 and 2, the detachable shelter frame 20 for supporting two auxiliary lenses 201, 202 comprises a bridge 21 extended between the two auxiliary lenses 201, 202, a pair of resilient mounting device 22, 23 provided on two inner sides of the auxiliary lenses 201, 202 for mounting the shelter frame 20 on the primary spectacle frame 10.

According to the first preferred embodiment, as shown in FIGS. 1 and 2, the two resilient mounting devices 22, 23 are provided at the two inner sides of the two auxiliary lenses 201, 202 respectively for locking with the primary bridge 111 of the primary spectacle frame 10 so as to securely mounted the shelter frame 20 on the primary spectacle frame 10. The auxiliary lenses 201, 202 can be shaded lenses supported by the shelter frame 20 to form a detachable sunglasses.

Figure 3:
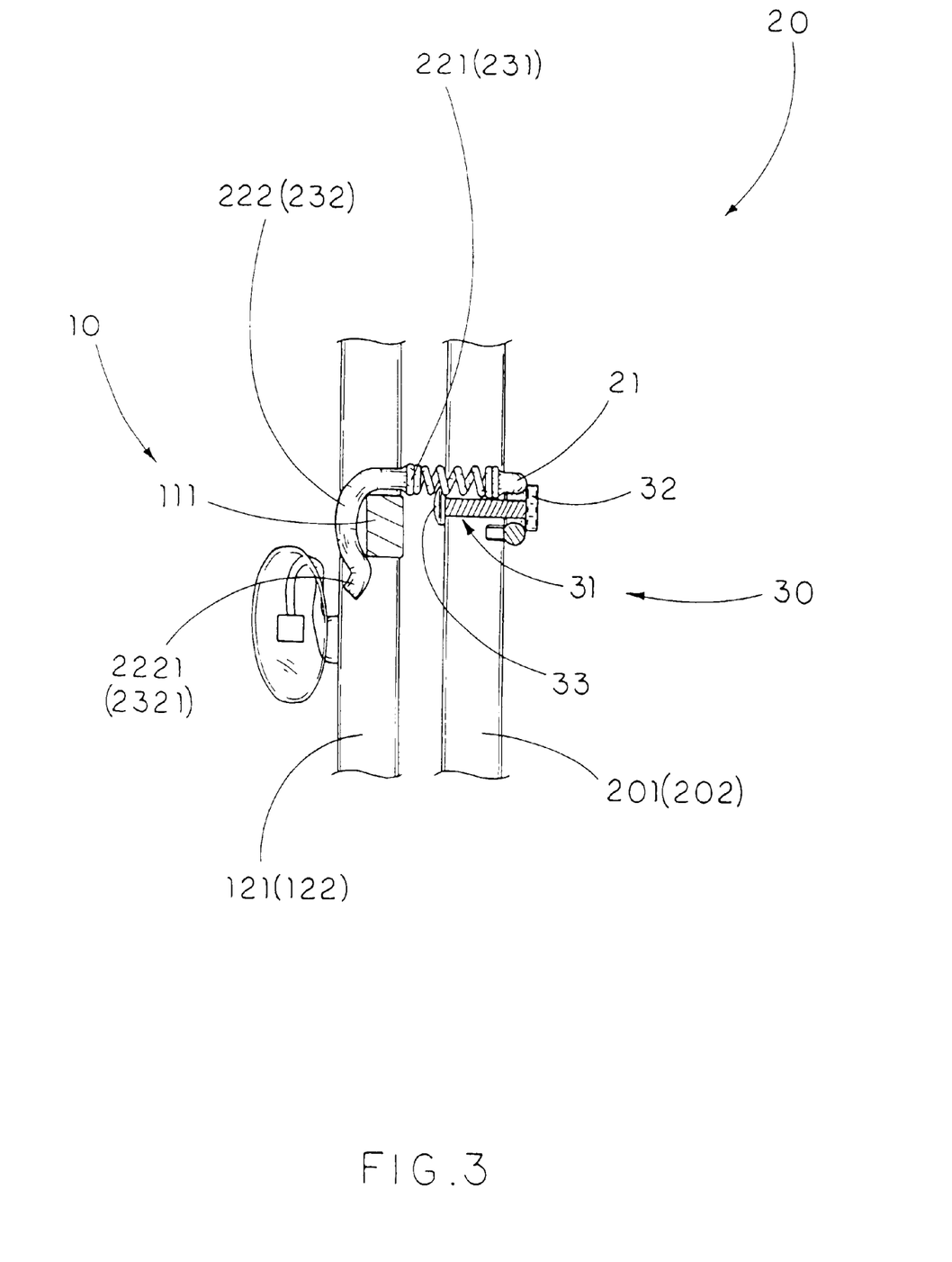
FIG. 3 is a sectional view of the detachable shelter frame mounted on the primary spectacle frame according to the above first preferred embodiment of the present invention.

Each of the resilient mounting device 22, 23 comprises a resilient arm 221, 231. The two resilient arms 221, 231 are extended rearwardly from two root portions of the bridge 21 of the shelter frame 20 to extend over the primary bridge 111 of the primary spectacle frame 10, and an engaging member 222, 232 which is connected to the resilient arm 221, 231 and extended to press against a rear side of the primary bridge 111 of the primary spectacle frame 10, as shown in FIGS. 2 and 3, wherein the two resilient arms 221, 231 substantially pull the engaging members 222, 232 towards the primary spectacle frame 10 so as to apply an urging pressure against the primary spectacle frame for holding the frame body 11 of the primary spectacle frame 10 between the shelter frame 20 and the engaging members 222, 232, so as to securely mounting the shelter frame 20 in front of the primary spectacle frame 10.

According to the first preferred embodiment as shown in FIGS. 1 and 2, the two resilient arms 221, 231 are compression springs horizontally and rearwardly extended from the two inner sides of the shelter frame 20, i.e. the two root portions of the bridge 21. Each of the resilient arms 221, 222 has a front end attaching to the respective root portion of the bridge 21 by welding and a rear end connecting to the respective engaging member 222, 232. Therefore, the resilient arms 221, 231 will normally pull the shelter frame 20 and the engaging members 222, 232 together so as to retain a shortest distance between the shelter frame 20 and the primary spectacle frame 10, as shown in FIG. 3.

The two resilient arms 221, 231 will pull the two engaging members 222, 232 to urge against the primary bridge 111, so as to securely engage the two engaging members 222, 232 with the primary bridge 111 from behind when the shelter frame 20 is mounted on the primary spectacle frame 10. Furthermore, the resilient arms 221, 231 are adapted for bending in an upward and a downward direction, so as to self-adjust the engaging members 222, 232 to lock up with the primary bridge 111. Preferably, the compression spring of each of the resilient arms 221, 231 has a diameter gradually decrease from a mid-portion thereof to two ends of the compression spring so as to enhance the elasticity of the resilient arm 221, 231.

Each engaging member 222, 232 is downwardly and suspendedly affixed at the rear end of the resilient arm 221, 231, preferably welded to the resilient arm 221, 231. Moreover, each of the engaging members 222, 232 has a S-shaped engagement tip 2221, 2321 provided, which can be formed by bending a bottom end thereof inwardly, for hooking a bottom edge of the primary bridge 111, so as to lock up the position of the two resilient mounting device 22, 23 of the shelter frame 20 on the primary spectacle frame 10, as shown in FIG. 2, and to securely mount the shelter frame 20 on the primary spectacle frame 10 so as to prevent up and down movements of the shelter frame 20 with respect to the primary spectacle frame 10. It is worth to mention that the engaging members 222, 232 can have a bigger or smaller size according to size of primary bridge 111 of the primary spectacle frame 10.

Accordingly, the resilient mounting devices 22, 23 of the shelter frame 20 of the present invention not only firmly attach the shelter frame in front of the primary spectacle frame 10 by applying urging pressure on the primary bridge 11 in horizontal direction, but also minimize a gap between the primary frame 10 and the shelter frame 20, which will deflect the incoming light, so as to provide a better protection to the user's eyes.

The detachable shelter frame 20 according to the first embodiment is a rimless spectacle frame, wherein no soldering is needed in order to connect the bridge 21 with the two auxiliary lenses 201, 202, wherein the bridge 21 has two root portions bent to form two U-shaped mounting loops respectively wherein the two resilient arms 221, 231 are extended from the two root portions of the bridge 21 respectively.

Moreover, two free ends of the two root portions are integrally and backwardly extended from the root portions to integrally connect with the two front ends of the two resilient arms 221, 231 respectively.

Figure 4:
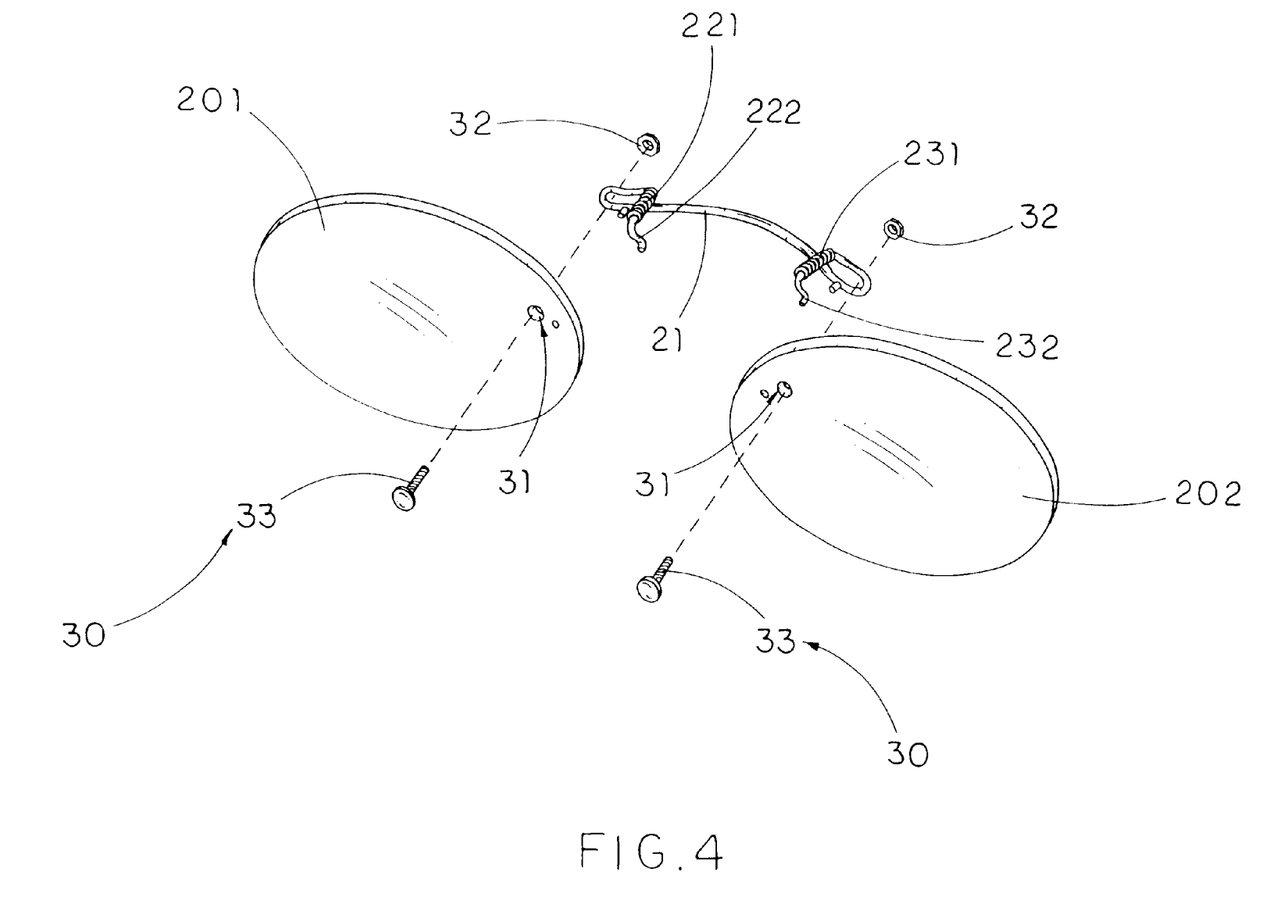
FIG. 4 is an exploded perspective view of the detachable shelter frame according to the above first preferred embodiment of the present invention.

As shown in FIG. 4, the shelter frame 20 further comprises a pair of locking units 30 for securely locking the bridge 21 between the two auxiliary lenses 201, 202. Each of the root portions of the bridge 21 is positioned in front of a through slot 31 provided on the respective auxiliary lens 201, 202 adjacent to an inner side edge thereof and each of the locking units 30 comprises a locking nut 32 having a threaded hole and a locking bolt 33 having an enlarged head portion and a threaded tail portion having a diameter slightly smaller than that of the through slot 31 for fittedly inserting the thread tail portion therethrough. Each of the root portions of the bridge 21 is adapted to position in front of the through slot 31 of the respective auxiliary lens 201, 202 and each of the locking nut 32 is adapted for screwing with said threaded tail portion of said locking bolt 33, so as to lock up the bridge 21 between the two auxiliary lenses 201, 202. In other words, the loop of each of the root portions of the bridge 21 and the respective auxiliary lens 201, 202 are clamped between the head portion of the locking nut 32 and the locking bolt 33.

Figure 9:
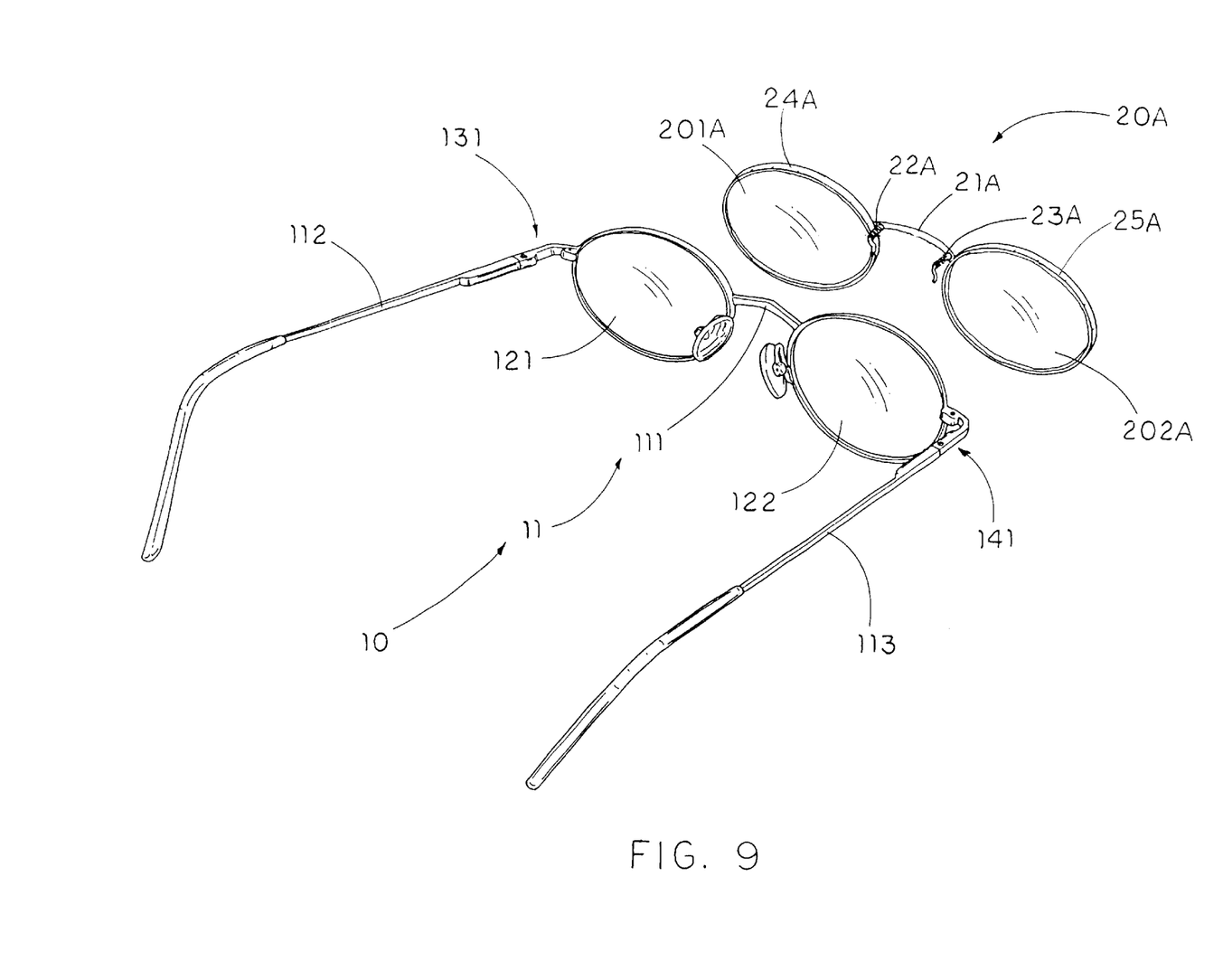
FIG. 9 is a perspective view of an alternative mode of the detachable shelter frame for spectacle according to the above first preferred embodiment of the present invention.

FIG. 9 illustrates an alternative mode of the above first preferred embodiment, wherein the detachable shelter frame 20A is a regular frame comprises two loop rims 24A, 25A to mount two lenses 201A, 202A in position and a bridge 21A having two root portions connected to two inner sides of the two loop rims 24A, 25A respectively, wherein the two front ends of the two resilient arms 221A, 231A of the two resilient mounting devices 22A, 23A are integrally affixed to two root portions of the bridge 21A.

Figure 5:
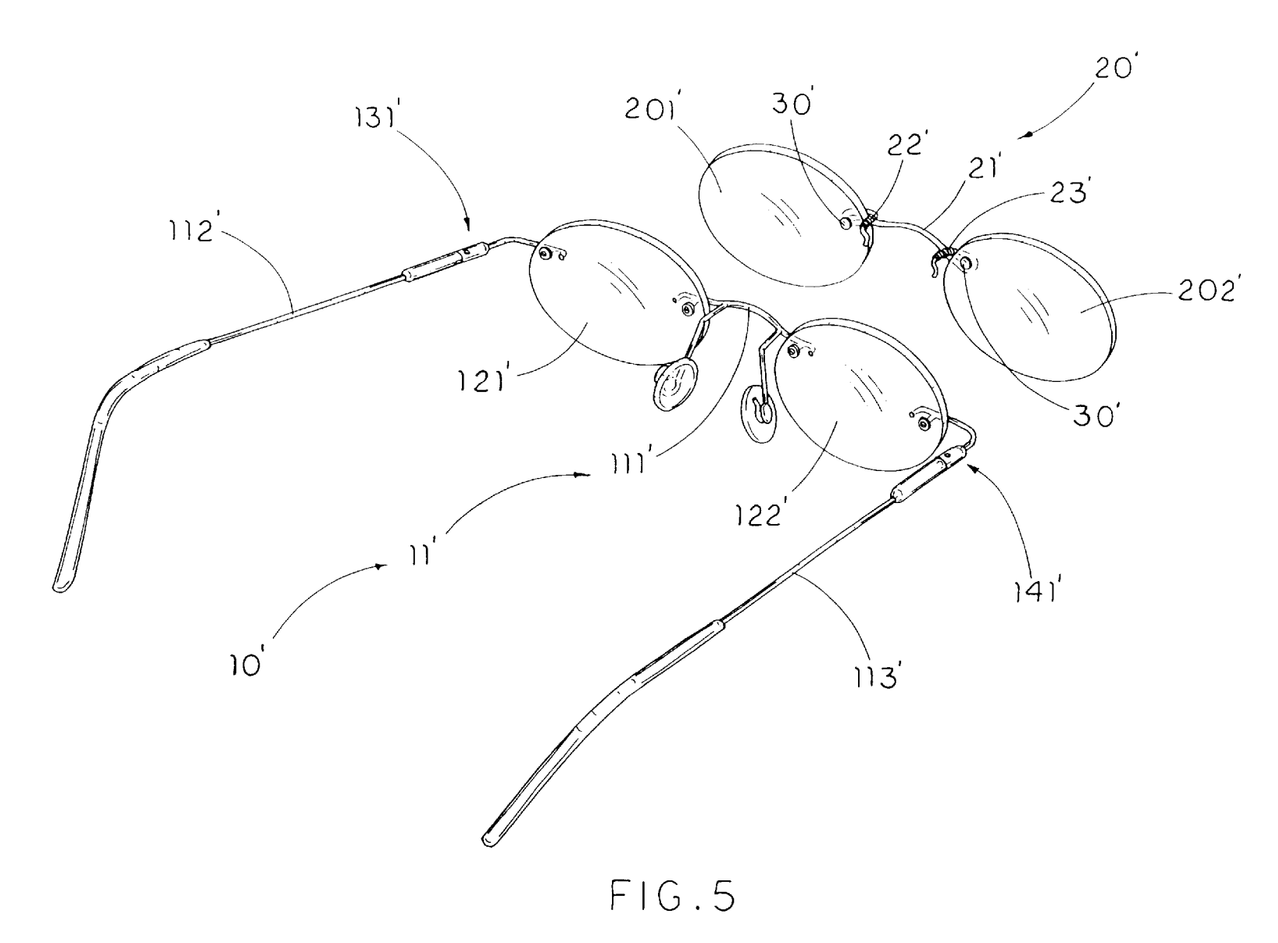
FIG. 5 is a perspective view of a detachable shelter frame for spectacle according to a second preferred embodiment of the present invention.

Referring to FIG. 5, a second embodiment of the shelter frame 20' illustrates an alternative mode of the present invention, wherein the shelter frame 20' according to the second embodiment is adapted for detachably mounting on a rimless primary spectacle frame 10'.

Figure 6:
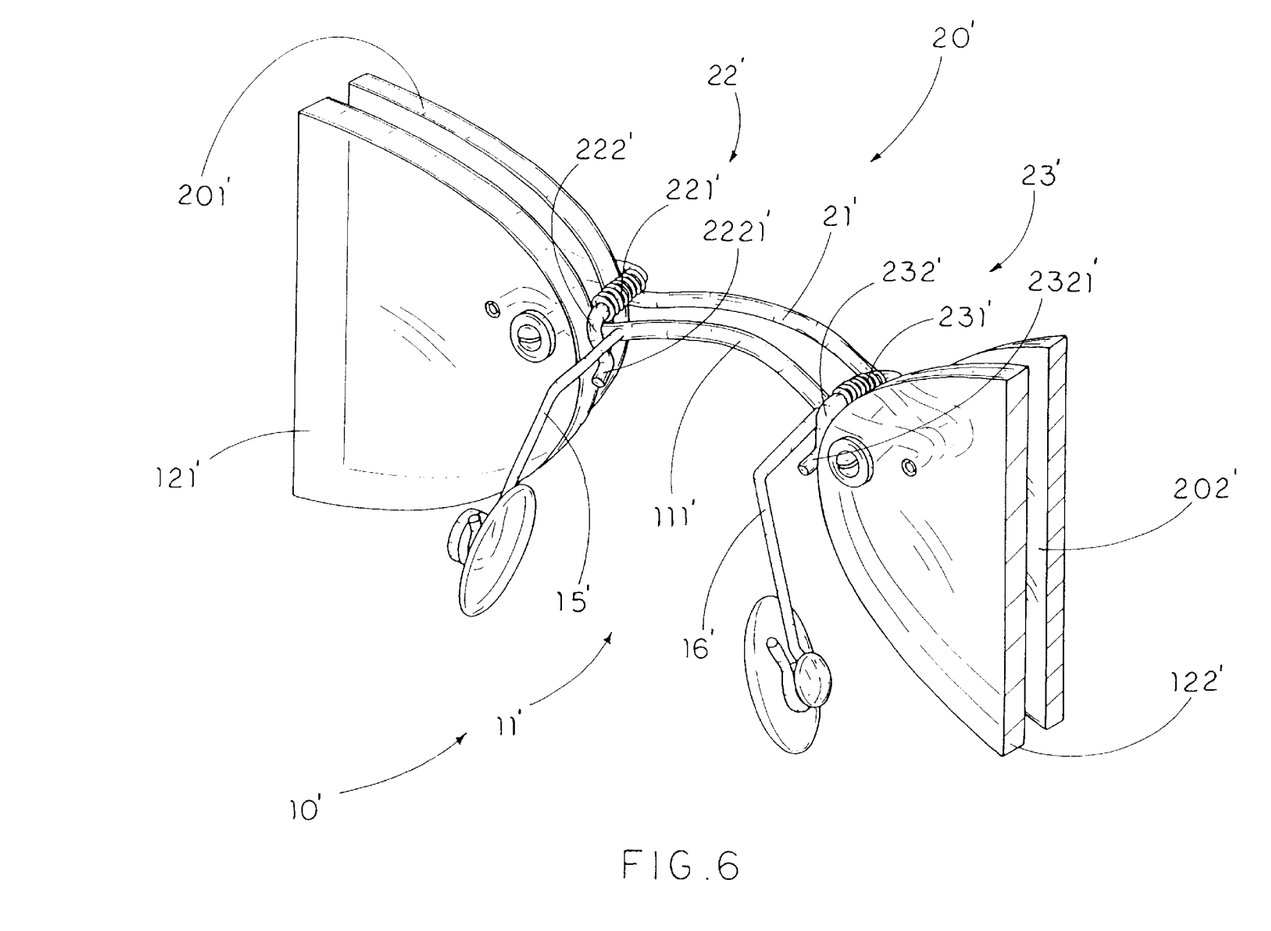
FIG. 6 is a perspective view of the detachable shelter frame mounted on a primary spectacle frame according to the above second preferred embodiment of the present invention.

As shown in FIGS. 5 and 6, the primary bridge 111' and the two side extensions 13', 14' are directly fastened to the edges of the two lenses 121', 122' wherein each of the side extension 13', 14' has a hinge portion 131', 141' extended rearwardly therefrom for pivotally coupling a temple 112', 113. The primary spectacle frame 10' further comprises a pair of nose supports 15', 16' downwardly extended from two end portions of the primary bridge 111'. It is worth to mention that each of the resilient mounting devices 22', 23' is adapted to securely lock on the primary bridge 111' between the respective auxiliary lens 201, 202 and the nose support 15', 16', so as to prevent sideward movements of the shelter frame 20' with respect to the primary spectacle frame 10'.

Each of the resilient mounting device 22', 23' of the shelter frame 20' of the second embodiment has the same structure as mentioned in the first embodiment, wherein each of the resilient mounting device 22', 23' comprises a resilient arm 221', 231' extending rearwardly from an end portion of the bridge 21' of the shelter frame 20' to extend over the primary bridge 111' of the primary spectacle frame 10', and an engaging member 222', 232' which is connected to the resilient arm 221'. 231' and extended to press against a rear side of the primary bridge 111' of the primary spectacle frame 10'.

The two resilient arms 221', 231' are substantially pull the engaging members 222', 232' towards the primary spectacle frame 10' so as to apply an urging pressure against the primary spectacle frame for holding the frame body 11' of the primary spectacle frame 10' between the shelter frame 20' and the engaging members 222', 232', so as to securely mounting the shelter frame 20' in front of the primary spectacle frame 10'. Each of the engaging members 222', 232' has a S-shaped engagement tip 2221', 2321' formed at a bottom end thereof for hooking a bottom edge of the primary bridge 111', so as to lock up the position of the two resilient mounting device 22', 23' of the shelter frame 20' on the primary spectacle frame 10'.

Figure 7:
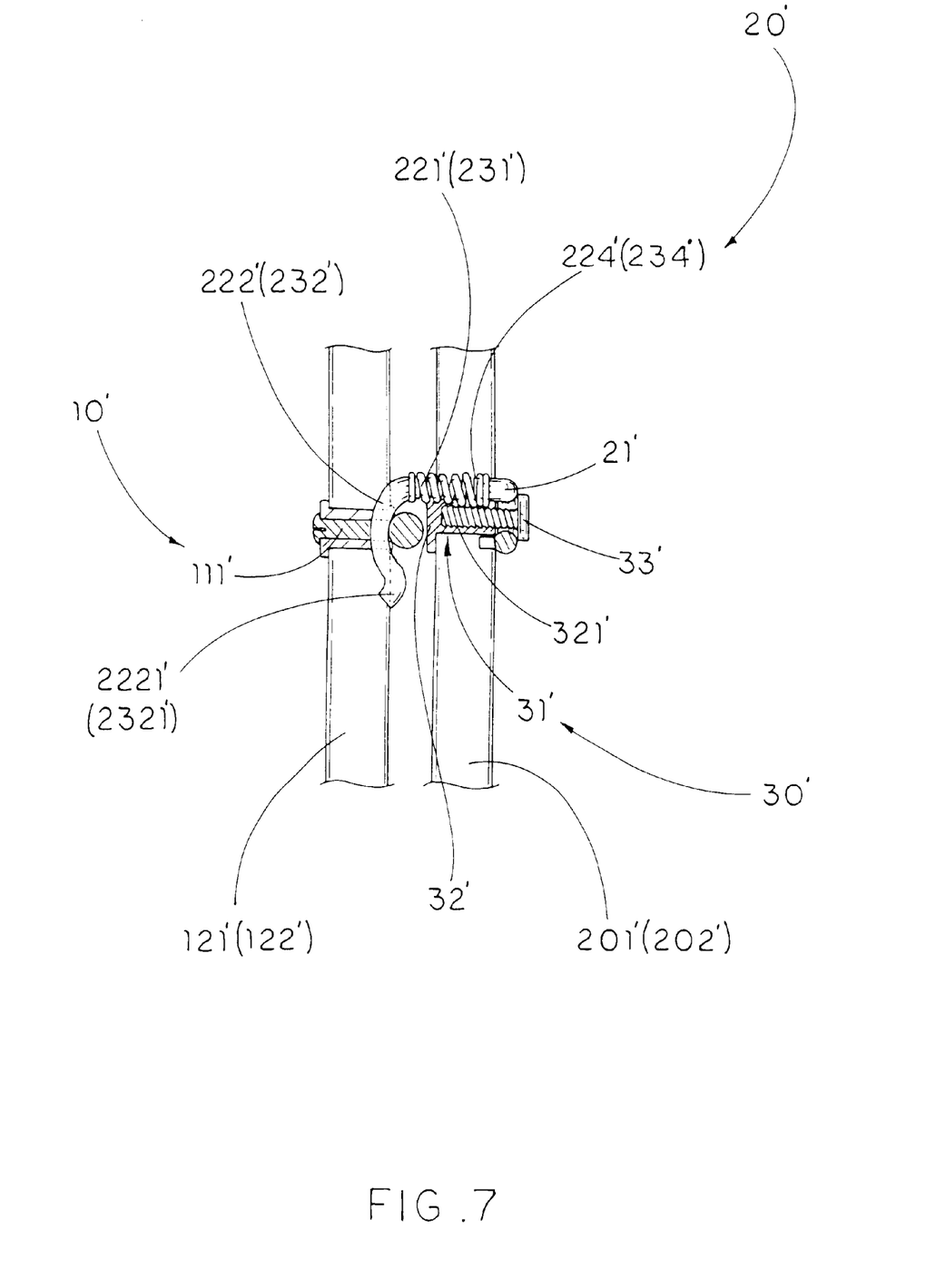
FIG. 7 is a sectional view of the detachable shelter frame mounted on the primary spectacle frame according to the above second preferred embodiment of the present invention.

Moreover, each of the resilient mounting device 22', 23' further comprises an arm guider 224', 234' for guiding the extension and compression of the respective resilient arm 221', 231' and rigidly supporting the resilient arm 221', 231' to extend over the primary bridge 111', as shown in FIG. 7. The two arm guiders 224', 234' are two guiding pins rearwardly and integrally extended from two end portions of the bridge 111' of the shelter frame 20' and inserted into the front ends of the resilient arms 221', 231' respectively when compression springs are used as the resilient arms 221', 231'.

Figure 8:
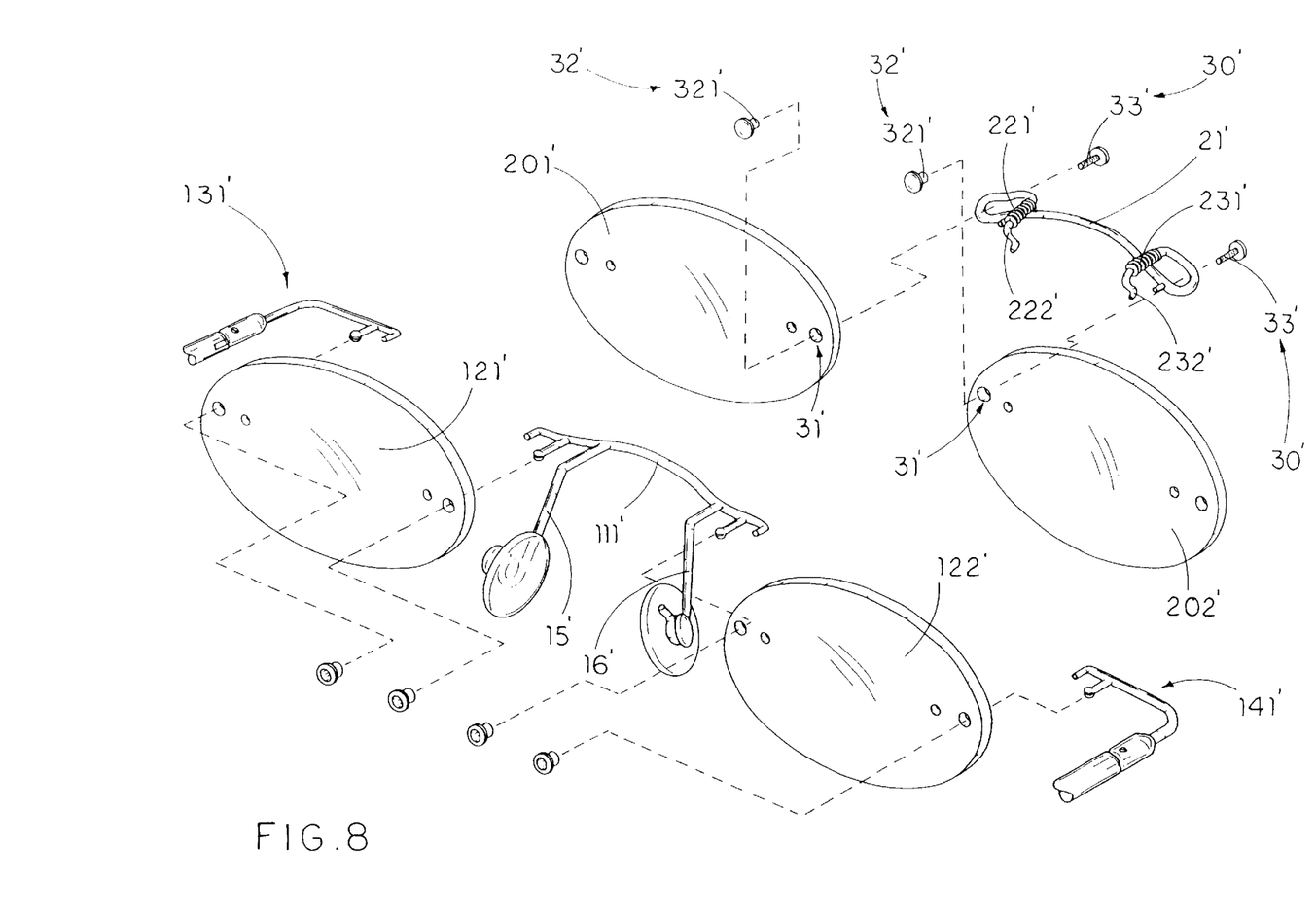
FIG. 8 is an exploded perspective view of the detachable shelter frame according to the above second preferred embodiment of the present invention.

Accordingly, each of the locking units 30' comprises a locking nut 32' having a tubular holder: 321' made of elastic material such as silicone and a locking bolt 33' having a tail portion adapted to insert into the tubular holder 321' of the locking nut 32' in such a manner that the loop of the respective root portion of the bridge 21' and the respective auxiliary lens 201', 202' are clamped between the locking nut 32' and the locking bolt 33' through the respective through slot 31', as shown in FIG. 8.

As shown in FIG. 7, the tubular holder 321' of the locking nut 32' has a size and shape adapted to fittedly insert into the through slot 31' on the respective auxiliary lens 201', 202'. Thus, the locking bolt 33' has at least two engaging teeth 331' outwardly protruded from the tail portion thereof for securely engaging with an inner surface of the tubular holder 321' of the locking nut 32', as shown in FIG. 7. It is worth to mention that the attachment between the locking bolt 33' and the locking nut 32' is provided within the through slot 31', so as to minimize a thickness of the attachment which may affect the mounting operating of the shelter frame 20' in front of the primary spectacle frame 10' and prevent the risk of scratching the lenses 121', 122' of the primary spectacle frame 10'. Thus, the tubular holder 321' can be deformed to a corresponding shape when the locking bolt 33' is inserted into the tubular holder 321', so as to securely engage the engaging teeth 331' with the inner surface of the tubular holder 321'.

In view of above, in addition to the features achieved in the '180 patent, the above disclosed detachable shelter frame can further achieve the following features:

(a) The resilient mounting devices of the shelter frame is specifically designed for securely locking on the primary bridge of the primary spectacle frame so as to prevent up and down or sideward movement of the shelter frame with respect to the primary spectacle frame.

(b) The shelter frame provide a simple but secure attachment between the bridge and the lens without requiring any soldering work for the attachment, so as to minimize the manufacturing cost of the shelter frame.

(c) The detachable shelter frame of the present invention is designed for all kinds of the primary spectacle frame because no specific modification is required for the primary spectacle frame to adapt the shelter frame, so that no magnet is required to position in front of the user' eyes all the time.

What is claimed is:

1. A detachable shelter frame for mounting in front of a primary spectacle frame which comprises a frame body comprising a primary bridge connected between two lenses, two side extensions provided at two outer sides of said lenses respectively, and two temples rearwardly extended from said side extensions respectively, wherein said shelter frame which supports two auxiliary lenses comprises:

a bridge extended between said two auxiliary lenses; and a pair of resilient mounting devices provided at two inner sides of said auxiliary lenses for mounting said shelter frame in front of said primary spectacle frame, wherein each of said resilient mounting devices comprises:

a resilient arm extending rearwardly from said inner side of said respective auxiliary lens of said shelter frame for riding on said primary spectacle frame; and an engaging member which is connected to said resilient arm for pressing against a rear side of said primary spectacle frame in such a manner that said two resilient arms substantially pull said two engaging members towards said primary spectacle frame so as to apply an urging pressure against said primary spectacle frame for holding said frame body of said primary spectacle frame between said shelter frame and said engaging members, so as to securely mount said shelter frame in front of said primary spectacle frame.

2. The detachable shelter frame, as recited claim 1, wherein said bridge, having two root portions, is extended between said two inner sides of said auxiliary lens of said shelter frame, wherein said two resilient arms are extended rearwardly from said two root portions of said bridge respectively and said engaging members press against a rear side of two end portions of said primary bridge of said primary spectacle frame.

3. The detachable shelter frame, as recited in claim 2, wherein said two resilient arms are compression springs rearwardly extended from said two root portions of said bridge respectively, wherein each of said resilient arms has a front end integrally connected with two root portions of said bridge of said shelter frame and a rear end connected with said respective engaging member, wherein said two resilient arms pull said two engaging members to urge against said rear side of said primary bridge so as to securely engage said two engaging members with said primary bridge from behind so as to mount said shelter frame in front of said primary spectacle frame.

4. The detachable shelter frame, as recited in claim 3, wherein each of said engaging members is downwardly and suspendedly affixed to said rear end of said resilient arm, and each of said engaging members has an engagement tip provided at a bottom end portion thereof for hooking a bottom edge of said primary bridge so as to lock up said position of said two resilient mounting devices of said shelter frame on said primary spectacle frame and to securely mount said shelter frame in front of said primary spectacle frame.

5. The detachable shelter frame, as recited in claim 4, further comprises a pair of locking units, wherein said bridge has two root portions provided at said two end portions, wherein each of said root portions is bent to form a U-shaped mounting loop, wherein said pair of locking units securely connect said two mounting loops of said bridge to said two inner sides of said two auxiliary lenses respectively.

6. The detachable shelter frame, as recited in claim 5, wherein said front ends of said two resilient arms are integrally connected two free ends of said two mounting loops respectively.

7. The detachable shelter frame, as recited in claim 6, wherein each of said resilient mounting devices further comprises an arm guider for guiding an extension and compression of said respective resilient arm and rigidly supporting said resilient arm to extend over said primary bridge of said primary spectacle frame.

8. The detachable shelter frame, as recited in claim 7, wherein each of said arm guiders comprises a guiding pin rearwardly and integrally extended from said bridge of said shelter frame and inserted into said front end of said respective resilient arm.

9. The detachable shelter frame, as recited in claim 8, wherein each of said locking units contains a through slot provided on said respective auxiliary lens adjacent to an inner side edge thereof, a locking bolt having an enlarged head portion and a tail portion, and an elastic locking nut having a tubular holder having a size and shape fit into said through hole, wherein each of said root portions of said bridge is adapted to position in front of said through hole of said respective lens for said tail portion of said locking bolt passing through said respective root portion of said bridge and said through hole to insert into said tubular holder of said locking nut, so as to lock up said bridge between said two auxiliary lenses, whereby said loop of each of said root portions of said bridge and said respective lens is clamped between said head portion of said respective locking bolt and said locking nut.

10. The detachable shelter frame, as recited in claim 9, wherein said locking bolt has at least two engaging teeth outwardly protruded from said tail portion thereof for securely engaging with an inner surface of said tubular holder of said locking nut.

11. The detachable shelter frame, as recited in claim 7, wherein each of said locking units contains a through slot provided on said respective auxiliary lens adjacent to an inner side edge thereof, a locking bolt having an enlarged head portion and a tail portion, and an elastic locking nut having a tubular holder having a size and shape fit into said through hole, wherein each of said root portions of said bridge is adapted to position in front of said through hole of said respective lens for said tail portion of said locking bolt passing through said respective root portion of said bridge and said through hole to insert into said tubular holder of said locking nut, so as to lock up said bridge between said two auxiliary lenses, whereby said loop of each of said root portions of said bridge and said respective lens is clamped between said head portion of said respective locking bolt and said locking nut.

12. The detachable shelter frame, as recited in claim 6, wherein each of said locking units contains a through slot provided on said respective auxiliary lens adjacent to an inner side edge thereof, a locking bolt having an enlarged head portion and a tail portion, and an elastic locking nut having a tubular holder having a size and shape fit into said through hole, wherein each of said root portions of said bridge is adapted to position in front of said through hole of said respective lens for said tail portion of said locking bolt passing through said respective root portion of said bridge and said through hole to insert into said tubular holder of said locking nut, so as to lock up said bridge between said two auxiliary lenses, whereby said loop of each of said root portions of said bridge and said respective lens is clamped between said head portion of said respective locking bolt and said locking nut.

13. The detachable shelter frame, as recited in claim 12, wherein said locking bolt has at least two engaging teeth outwardly protruded from said tail portion thereof for securely engaging with an inner surface of said tubular holder of said locking nut.

14. The detachable shelter frame, as recited in claim 5, wherein each of said locking units contains a through slot provided on said respective auxiliary lens adjacent to an inner side edge thereof, a locking bolt having an enlarged head portion and a threaded tail portion having a diameter slightly smaller than that of said through slot for fittingly inserting said threaded tail portion therethrough, and a locking nut having a threaded hole, wherein each of said root portions of said bridge is adapted to position in front of said through hole of said respective lens for said threaded tail portion of said locking bolt passing through said respective root portion of said bridge and said through hole to screw with said locking nut, so as to lock up said bridge between said two auxiliary lenses, whereby said loop of each of said root portions of said bridge and said respective lens is clamped between said head portion of said respective locking bolt and said locking nut.

15. The detachable shelter frame, as recited in claim 4, wherein each of said resilient mounting devices further comprises an arm guider for guiding an extension and compression of said respective resilient arm and rigidly supporting said resilient arm to extend over said primary bridge of said primary spectacle frame.

16. The detachable shelter frame, as recited in claim 15, wherein each of said arm guiders comprises a guiding pin rearwardly and integrally extended from said bridge of said shelter frame and inserted into said front end of said respective resilient arm.

17. The detachable shelter frame, as recited in claim 3, further comprises a pair of locking units, wherein said bridge has two root portions provided at said two end portions, wherein each of said root portions is bent into a U-shaped mounting loop, wherein said pair of locking units securely connect said two root portions of said bridge to said two inner sides of said two auxiliary lenses respectively.

18. The detachable shelter frame, as recited in claim 17, wherein said front ends of said two resilient arms are integrally connected two free ends of said two mounting loops respectively.

19. The detachable shelter frame, as recited in claim 18, wherein each of said resilient mounting devices further comprises an arm guider for guiding an extension and compression of said respective resilient arm and rigidly supporting said resilient arm to extend over said primary bridge of said primary spectacle frame.

20. The detachable shelter frame, as recited in claim 19, wherein each of said locking units contains a through slot provided on said respective auxiliary lens adjacent to an inner side edge thereof, a locking bolt having an enlarged head portion and a tail portion, and an elastic locking nut having a tubular holder having a size and shape fit into said through hole, wherein each of said root portions of said bridge is adapted to position in front of said through hole of said respective lens for said tail portion of said locking bolt passing through said respective root portion of said bridge and said through hole to insert into said tubular holder of said locking nut, so as to lock up said bridge between said two auxiliary lenses, whereby said loop of each of said root portions of said bridge and said respective lens is clamped between said head portion of said respective locking bolt and said locking nut.

21. The detachable shelter frame, as recited in claim 18, wherein each of said locking units contains a through slot provided on said respective auxiliary lens adjacent to an inner side edge thereof, a locking bolt having an enlarged head portion and a tail portion, and an elastic locking nut having a tubular holder having a size and shape fit into said through hole, wherein each of said root portions of said bridge is adapted to position in front of said through hole of said respective lens for said tail portion of said locking bolt passing through said respective root portion of said bridge and said through hole to insert into said tubular holder of said locking nut, so as to lock up said bridge between said two auxiliary lenses, whereby said loop of each of said root portions of said bridge and said respective lens is clamped between said head portion of said respective locking bolt and said locking nut.

22. The detachable shelter frame, as recited in claim 21, wherein said locking bolt has at least two engaging teeth outwardly protruded from said tail portion thereof for securely engaging with an inner surface of said tubular holder of said locking nut.

23. The detachable shelter frame, as recited in claim 17, wherein each of said locking units contains a through slot provided on said respective auxiliary lens adjacent to an inner side edge thereof, a locking bolt having an enlarged head portion and a threaded tail portion having a diameter slightly smaller than that of said through slot for fittingly inserting said threaded tail portion therethrough, and a locking nut having a threaded hole, wherein each of said root portions of said bridge is adapted to position in front of said through hole of said respective lens for said threaded tail portion of said locking bolt passing through said respective root portion of said bridge and said through hole to screw with said locking nut, so as to lock up said bridge between said two auxiliary lenses, whereby said loop of each of said root portions of said bridge and said respective lens is clamped between said head portion of said respective locking bolt and said locking nut.

24. The detachable shelter frame, as recited in claim 3, wherein each of said resilient mounting devices further comprises an arm guider for guiding an extension and compression of said respective resilient arm and rigidly supporting said resilient arm to extend over said primary bridge of said primary spectacle frame.

25. The detachable shelter frame, as recited in claim 2, further comprises a pair of locking units, wherein said bridge has two root portions provided at said two end portions, wherein each of said root portions is bent into a U-shaped mounting loop, wherein said pair of locking units securely connect said two root portions of said bridge to said two inner sides of said two auxiliary lenses respectively.

26. The detachable shelter frame, as recited in claim 25, wherein said front ends of said two resilient arms are integrally connected two free ends of said two mounting loops respectively.

27. The detachable shelter frame, as recited in claim 26, wherein each of said resilient mounting devices further comprises an arm guider for guiding an extension and compression of, said respective resilient arm and rigidly supporting said resilient arm to extend over said primary bridge of said primary spectacle frame.

28. The detachable shelter frame, as recited in claim 27, wherein each of said locking units contains a through slot provided on said respective auxiliary lens adjacent to an inner side edge thereof, a locking bolt having an enlarged head portion and a tail portion, and an elastic locking nut having a tubular holder having a size and shape fit into said through hole, wherein each of said root portions of said bridge is adapted to position in front of said through hole of said respective lens for said tail portion of said locking bolt passing through said respective root portion of said bridge and said through hole to insert into said tubular holder of said locking nut, so as to lock up said bridge between said two auxiliary lenses, whereby said loop of each of said root portions of said bridge and said respective lens is clamped between said head portion of said respective locking bolt and said locking nut.

29. The detachable shelter frame, as recited in claim 26, wherein each of said locking units contains a through slot provided on said respective auxiliary lens adjacent to an inner side edge thereof, a locking bolt having an enlarged head portion and a tail portion, and an elastic locking nut having a tubular holder having a size and shape fit into said through hole, wherein each of said root portions of said bridge is adapted to position in front of said through hole of said respective lens for said tail portion of said locking bolt passing through said respective root portion of said bridge and said through hole to insert into said tubular holder of said locking nut, so as to lock up said bridge between said two auxiliary lenses, whereby said loop of each of said root portions of said bridge and said respective lens is clamped between said head portion of said respective locking bolt and said locking nut.

30. The detachable shelter frame, as recited in claim 29, wherein said locking bolt has at least two engaging teeth outwardly protruded from said tail portion thereof for securely engaging with an inner surface of said tubular holder of said locking nut.

31. The detachable shelter frame, as recited in claim 25, wherein each of said locking units contains a through slot provided on said respective auxiliary lens adjacent to an inner side edge thereof, a locking bolt having an enlarged head portion and a threaded tail portion having a diameter slightly smaller than that of said through slot for fittingly inserting said threaded tail portion therethrough, and a locking nut having a threaded hole, wherein each of said root portions of said bridge is adapted to position in front of said through hole of said respective lens for said threaded tail portion of said locking bolt passing through said respective root portion of said bridge and said through hole to screw with said locking nut, so as to lock up said bridge between said two auxiliary lenses, whereby said loop of each of said root portions of said bridge and said respective lens is clamped between said head portion of said respective locking bolt and said locking nut.

32. The detachable shelter frame, as recited in claim 31, wherein said locking bolt has at least two engaging teeth outwardly protruded from said tail portion thereof for securely engaging with an inner surface of said tubular holder of said locking nut.

33. The detachable shelter frame, as recited in claim 2, wherein each of said resilient mounting devices further comprises an arm guider for guiding an extension and compression of said respective resilient arm and rigidly supporting said resilient arm to extend over said primary bridge of said primary spectacle frame.

* * * * *